United States Patent [19]

Perkins

[11] Patent Number: 6,063,632

[45] Date of Patent: May 16, 2000

[54] WATER LEAK DETECTION

[76] Inventor: Gary Perkins, 14 Harrison St., New York, N.Y. 10013

[21] Appl. No.: 09/190,876

[22] Filed: Nov. 12, 1998

[51] Int. Cl.[7] .......................... G01N 31/00; G01D 11/00; G01D 13/00; G08B 5/40
[52] U.S. Cl. .............................. 436/3; 116/200; 116/201; 116/214
[58] Field of Search ................... 436/3; 48/195; 116/200, 201, 214

[56] References Cited

U.S. PATENT DOCUMENTS

| | | | |
|---|---|---|---|
| 2,918,033 | 12/1959 | Snyder | 116/206 |
| 2,918,893 | 12/1959 | Norton | 116/206 |
| 3,140,156 | 7/1964 | Koh | 422/117 |
| 3,634,053 | 1/1972 | Klass et al. | 48/195 |
| 4,025,315 | 5/1977 | Mazelli | 44/52 |
| 4,294,716 | 10/1981 | Saccavino et al. | 252/68 |
| 4,487,613 | 12/1984 | Yoshida et al. | 48/197 |
| 4,504,281 | 3/1985 | William, Jr. et al. | 48/195 |
| 5,049,312 | 9/1991 | Quaife et al. | 252/408 |
| 5,320,967 | 6/1994 | Avallone et al. | 436/50 |
| 5,352,244 | 10/1994 | Azok | 8/506 |
| 5,539,383 | 7/1996 | Chin | 340/64 |
| 5,733,272 | 3/1998 | Brunner et al. | 604/359 |

*Primary Examiner*—Jill Warden
*Assistant Examiner*—Dwayne K. Handy
*Attorney, Agent, or Firm*—Morgan & Finnegan, L.L.P.

[57] ABSTRACT

A method and device for detecting water leaks is disclosed. The method and device comprise an odorant in a water soluble barrier. The odorant and water soluble barrier can be contained in a housing and placed in a location where water leakage can occur. In the method and device described herein, leaking water dissolves the barrier and releases the odorant into the atmosphere thereby alerting persons to the presence of water as a result of a leak.

7 Claims, No Drawings

WATER LEAK DETECTION

FIELD OF INVENTION

The present invention relates to the detection of water leaks generally and in particular to a method and device for detecting water leaks by the use of an odorant.

BACKGROUND OF THE INVENTION

Property loss due to water damage costs homeowners and businesses billions of dollars every year. Common water damage happens as a result of plumbing problems, rain water and flooding. For example, water damage can occur due to problems with water heaters, boilers, dishwashers, sump pumps, faucets, washing machines, pipe fasteners, air conditioners, water filters, dehumidifiers, toilets, tanks, showers, pipe breaks, leaky roofs and gutters, broken windows, sinks, etc. In many instances, the leaks can be small but, unless detected, can escalate and add up to substantial property losses in both the home and business environment.

There are several methods and devices currently in use for the detection of water leaks. These devices are based on the use of electronic alarms and circuitry to detect water. See for example U.S. Pat. No. 5,539,383. There are also known to be fire alarm systems which can be used to detect the presence of water. These devices, however, can be expensive. Additionally, such devices have the disadvantage of running on electricity or batteries which must be monitored by the user. None of these methods or devices seem to describe the instant invention as claimed.

Therefore, there remains a need for a water leak detection method and device which is simple, inexpensive and easy to use. The present invention constitutes such a method and device for detecting water leaks by use of an odorant.

SUMMARY OF THE INVENTION

Objects and advantages of the invention are set forth below.

It is a principle object of the present invention to provide a novel method and device for detecting water leaks which is simple, effective, inexpensive and easy to use.

It is a further object of the present invention to provide a novel method and device for alerting people to water leaks before significant water damage occurs.

Accordingly, the method and device for detecting water leaks of the present invention comprises the release of an odorant by the presence of water. The method of the present invention comprises detecting water leaks by providing an odorant in a water soluble matrix or barrier such that water leakage causes the water soluble matrix or barrier to dissolve releasing the odorant and alerting the appropriate people of the presence of water. The water leakage detection device of the present invention comprises the enclosure of an odorant in a water soluble matrix or barrier within a housing such that when water enters the housing and contacts the matrix or barrier, it dissolves the water soluble barrier releasing the odorant and thereby alerting the appropriate people of the presence of water.

DETAILED DESCRIPTION OF THE INVENTION

The present invention relates to both a method and device for detecting water leaks by releasing a detectable odor.

The method of the present invention is the release of an odorant by water wherein the odorant is retained by a water soluble matrix or barrier. Several systems for use in this method are described. One embodiment of the present invention includes a physical mixture of the odorant in a water soluble wax or polymer. Another embodiment of the invention is an encapsulate that surrounds an odorant with a water soluble wall. The production of these encapsulates are by processes generally known in the art including, for example, processes such as spray drying, granulation and coacervation. Such encapsulates can therefore be in granular or pellet form. In another embodiment of the present invention, the material that is contained in the water soluble matrix or barrier is transformed into an odorant upon contact of the material with water. A further embodiment of the present invention includes an odorant retained inside a water soluble film. The creation of these embodiments is generally known by those skilled in the art.

In the method of the present invention, any one of the above-described embodiments are placed in a location where water leakage may occur. Examples of such locations include unattended, not observable or difficult to access areas such as, for example, bathrooms, basements, sinks, dishwashers, hot water heaters, unit boilers, water tanks and any place near a pipe. Water leakage causes the soluble matrix or barrier to dissolve releasing the odorant. The odorant will alert persons that water is present allowing for corrective measures to be taken before serious water damage occurs.

Many water soluble material can be used in the present invention. Examples of such water soluble materials include polyvinyl alcohol, gelatin, methyl cellulose and starch. The water soluble matrix or barrier should be resistant to humidity.

The odorant of the present invention can be selected from the many available. Preferred odorants of the present invention are those that have low detection thresholds. Most preferred odorants of the present invention are those that have a recognizable distinctive and/or unpleasant odor. The odorant should be stable over a long period of time and be resistant to humidity. The odorant can be a single material or a mixture. The odorant should preferably have one component that has a high vapor pressure so that it diffuses rapidly when released by water. The odorant should also not be too water soluble so that it can be released and not dissolved by the water. Such a mixture may also have some low vapor pressure materials that will evaporate slowly so that if the area of the water leak is unoccupied or unattended for a few or several days, an odor will still be apparent. Accordingly, in a further embodiment of the present invention, the odorant can be time released.

Examples of odorants include fragrance materials such as citronellal, lime oxide, alpha pinene and eucalyptol and odorants that have strong distinct and/or unpleasant odors such as mercaptans, thiomenthone and methional. Other odorants, such as peppermint, may be used. Further odorants can be found in Perfume and Flavor Chemicals (Aroma Chemicals) by Steffen Arctander, Steffen Arctander's Publications, Las Vegas, Nev., 1969.

The following examples serve to further illustrate the inventive concept and are not intended to be construed as limitations on the invention, which is defined by the claims.

EXAMPLE 1

A 10% (w/w) dispersion of gelatin in water at 40° C. is prepared and added to it with continuous stirring is an equal weight of a water insoluble low threshold fragrance material, dibutyl sulphide A 20% (w/w) sodium sulphate solution is added to make up 50–60% of the final total volume. The system is cooled to 5° C. Glutaraldehyde is added until capsules form. The resulting capsules are washed and dried. One capsule is dropped in a pint of water and left in a closed room for half an hour. On opening the door a strong distinctive repulsive smell is evident.

EXAMPLE 2

Example 1 is repeated using citronellal as the fragrance materials and a strong green citrusy odor is evident.

EXAMPLE 3

An aqueous mixture of 2.5% (w/w) gelatin and 2.5% gum acacia are prepared. To the gelatin solution 5% (w/w) of skatole is added and emulsified. An equal volume of the gum acacia solution is added with continuous stirring. The temperature of the system is maintained above 35° C. The pH is adjusted to 3.8–4.3 with continuous mixing. The system is cooled to 5° C. and glutaraldehyde is added adjusting the pH to the above range until capsules form. The capsules are washed and then dried.

One capsule is dropped in a pint of water and left in a closed room for half an hour. On opening the door, a strong fecal animal smell is noted.

EXAMPLE 4

The process in example 3 is repeated using 2-thienyl mercaptan. A very strong burnt caramel sulphurous odor is easily detected.

The present invention also includes a device for housing the water leak detection system. Such a device is a housing which can contain the water soluble barrier and odorant described above. The housing must have openings allowing for water to reach the water soluble barrier and odorant described above. The housing can be simple and small and be placed near any area which may be subject to water leakage.

In one embodiment of the present invention, the housing can be a plastic unit containing the water soluble barrier and odorant described above. In this embodiment, holes are placed throughout the housing. Leaking water contacts and permeates the housing such that the water soluble barrier dissolves releasing the odorant into the atmosphere. In this embodiment, the housing should set flush to the ground so that any leakage can be detected rapidly. Other housings can be devised in accordance with knowledge of those skilled in the art such that designs can be adapted to fit specific areas or tasks.

In another embodiment of the present invention, the housing can be contained in a larger adhesive shell to prevent child or pet ingestion. In another embodiment of the present invention, the device can be without a separate housing, i.e. pellets or granular in nature which can be easily spread around in a location subject to water leakage. In a further embodiment of the present invention, the housing can be a mesh sachet, which may or may not be weighted. In a further embodiment of the present invention, the odorant is embodied in a water soluble film which can be directly applied to an area subject to water leaks. For example, a water soluble film, adhesive coated or not, containing the odorant can be wrapped around pipes such that a small leak will release the odorant. Alternatively, a water soluble coating containing the odorant can be devised such that a pipe can be dipped in the mixture thereby coating the pipe.

The above described embodiments are intended, by way of example, to illustrate the principles of the invention but not to limit the scope of the claims. Various other embodiments and modifications to these embodiments may be made by those skilled in the art without departing from the scope of the following claims.

I claim:

1. A method for detecting water leaks which comprises embodying an odorant in a water soluble barrier, placing the water soluble barrier and odorant in a location where a water leak may occur, contacting the water soluble barrier with water so that the water soluble barrier is dissolved, releasing the odorant into the atmosphere detecting said odorant and correlating said detection to the presence of a water leak.

2. The method according to claim 1 wherein the water soluble barrier is selected from the group consisting of polyvinyl alcohol, gelatin, methyl cellulose and starch.

3. The method according to claim 1 wherein the odorant is selected from the group consisting of citronellal, lime oxide, alpha pinene and eucalyptol.

4. The method according to claim 1 wherein the odorant is selected from the group consisting of mercaptans, thio-menthone and methional.

5. The method according to claim 1 wherein the water soluble barrier and odorant are in granular or in pellet form.

6. The method according to claim 1 wherein the water soluble barrier and odorant are contained in a water permeable housing.

7. The method according to claim 1 wherein the water soluble barrier is a water soluble film.

* * * * *